(12) United States Patent
Nini

(10) Patent No.: US 12,715,530 B2
(45) Date of Patent: Aug. 25, 2026

(54) THREE-DIMENSIONAL BICYCLE SADDLE STRUCTURE

(71) Applicant: Roberto Nini, Rome (IT)

(72) Inventor: Roberto Nini, Rome (IT)

( * ) Notice: Subject to any disclaimer, the term of this patent is extended or adjusted under 35 U.S.C. 154(b) by 419 days.

(21) Appl. No.: 18/356,482

(22) Filed: Jul. 21, 2023

(65) Prior Publication Data

US 2025/0026423 A1 Jan. 23, 2025

(51) Int. Cl.
*B62J 1/02* (2006.01)

(52) U.S. Cl.
CPC .................................... *B62J 1/02* (2013.01)

(58) Field of Classification Search
CPC ........ B62J 1/02; B62J 1/18; B62J 1/26; F16F 7/12
See application file for complete search history.

(56) References Cited

U.S. PATENT DOCUMENTS 672,656 A * 4/1901 Tillinghast ................ B62J 1/00 297/197
674,451 A * 5/1901 Bunker ...................... B62J 1/26 297/214
5,244,251 A * 9/1993 Bourla ...................... B62J 1/26 297/DIG. 2
5,340,192 A * 8/1994 Hsh ........................... B62J 1/00 297/195.1
6,342,288 B1 * 1/2002 Tada .......................... C09J 7/26 428/158
6,733,023 B2 * 5/2004 Remmert .................. F16F 9/58 280/124.179
6,739,656 B2 * 5/2004 Yu ............................. B62J 1/00 297/202
7,367,619 B2 * 5/2008 Fregonese .................. B62J 1/00 297/202
D692,245 S * 10/2013 Attey ............................ D6/354
9,016,779 B2 * 4/2015 Attey ........................ B62J 1/02 297/204
9,682,530 B2 * 6/2017 Miyashita ................. B32B 3/28
(Continued)

FOREIGN PATENT DOCUMENTS

CN 201334068 Y 10/2009
CN 201751281 U * 2/2011 ................ B62J 1/02
(Continued)

OTHER PUBLICATIONS

Extended European Search Report mailed to Corresponding Patent Application No. 23186968.6-1009 on Jan. 26, 2024.

*Primary Examiner* — Thomas W Irvin
(74) *Attorney, Agent, or Firm* — Rosenberg, Klein & Lee

(57) ABSTRACT

A three-dimensional bicycle saddle structure includes a saddle body mounted on a support frame. The saddle body includes a plurality of vertical ribs, which are spaced from each other by a spacing distance and are arranged on a base layer in an arrangement direction. Each of the plurality of vertical ribs has a bottom on and extending upward from the base layer in an upward extension direction to a height. The tops of the plurality of vertical ribs jointly form a pressure supporting surface for the saddle body. When the tops of the plurality of vertical ribs receive an action force acting thereon, the plurality of vertical ribs, in response to the action force, individually generate adaptive inclined deformations of different degrees.

13 Claims, 4 Drawing Sheets

(56) References Cited

U.S. PATENT DOCUMENTS

| | | | | |
|---|---|---|---|---|
| 10,882,576 | B2 * | 1/2021 | Sung | B62J 1/26 |
| 12,435,768 | B2 * | 10/2025 | Whatcott | F16F 3/0873 |
| 2003/0042770 | A1 * | 3/2003 | Yu | B62J 1/00 297/215.16 |
| 2014/0110980 | A1 * | 4/2014 | Attey | B62J 1/02 297/195.1 |
| 2016/0257364 | A1 * | 9/2016 | Bigolin | B62J 1/20 |
| 2019/0308683 | A1 * | 10/2019 | Sung | B62J 1/26 |

FOREIGN PATENT DOCUMENTS

| | | | | |
|---|---|---|---|---|
| CN | 107826187 A | | 3/2018 | |
| EP | 4494985 A1 | * | 1/2025 | B62J 1/26 |
| TW | M661926 U | * | 10/2024 | B62J 1/02 |

* cited by examiner

THREE-DIMENSIONAL BICYCLE SADDLE STRUCTURE

BACKGROUND OF THE INVENTION

1. Field of the Invention

The present invention relates to a saddle structure, and more particularly to a saddle body structure made by means of three-dimensional (3D) printing.

2. The Related Arts

A saddle provides a support to the body weight of a bicyclist who is operating a bicycle, so that the bicyclist may tread the bicycle pedals freely and comfortably. Thus, the saddle is a necessary component for the bicycle. Also, the saddle also functions as a primary component for shock absorption when the bicycle is moving forward.

To protect a cyclist from bearing excessive vibration and also to enhance riding comfortability in riding a bicycle or an electrical vehicle, in the structure of a conventional saddle of the bicycle or electrical vehicle, a foaming material, a sponge-like material, or other flexible cushioning materials, are arranged at and combined with a bottom of the saddle to absorb a portion of the vibration.

However, fabrication of the conventional saddles is often a process of mass production of standard products. Choice among different products and diversification of products are thus reduced. As a result, the conventional saddles do not suit various needs for different users and different applications.

Further, although some manufacturers claim their products are of ergonomic designs, they generally do not meet the requirements for ergonomics due to limitation in respect of the materials and structures adopted for the saddles. Particularly, when a bicyclist is riding a bicycle, in addition to the body weight, there may be variations resulting from road situations (such as being uphill or downhill) or a change of body posture, which may apply different gravitational forces or vector forces to the saddle. In the known structure designs for saddles, there is none made for handling such a problem. In other words, the known saddles do not provide a function of dynamic shock absorption for adaptivity.

SUMMARY OF THE INVENTION

Thus, the primary objective of the present invention is to provide a bicycle saddle structure in order to provide a bicycle saddle or an electrical vehicle saddle with better use comfortability and a function of adaptive dynamic shock absorption.

To achieve such an objective, the present invention provides a saddle body, which includes a plurality of vertical ribs, which are spaced from each other by a spacing distance and are arranged on a base layer in an arrangement direction, each of the plurality of vertical ribs having a bottom on and extending upward from the base layer in an upward extension direction to a height, wherein tops of the plurality of vertical ribs jointly form a pressure supporting surface for the saddle body. When the tops of the plurality of vertical ribs receive an action force acting thereon, the plurality of vertical ribs, in response to the action force, individually generate adaptive inclined deformations of different degrees.

In the structure, the saddle body the saddle body is made of a material selected among polyurethanes (PU), ethylene vinyl acetate (EVA), polypropylene (PP), thermoplastic rubber (TPR), and polyvinyl chloride (PVC).

In the structure, the base layer and the plurality of vertical ribs are formed by three-dimensional (3D) printing.

In the structure, a reinforcing side circumferential rib is arranged on a side circumference of the saddle body to connect with each of the vertical ribs.

In the structure, each vertical rib of the plurality of vertical ribs is formed of a plurality of grating bars that are arranged parallel and spaced from each other, and a plurality of hollowed portions formed between adjacent ones of the grating bars.

In the structure, the base layer is formed as a structure having a continuous surface.

In the structure, the base layer comprises a central rib and at least one circumferential rib connected to the central rib in a mutually spaced manner.

The efficacy is that when a bicyclist sits on the saddle, the plurality of vertical ribs arranged according to the present invention provides the bicyclist, who is sitting on the saddle, with comfortable sense of sitting and an excellent effect of shock absorption and stress relief, and offers an excellent effect of ventilation.

In the fabrication of the saddle body according to the present invention, the three-dimensional (3D) printing technology can be readily applied to make design, development, and verification of products simpler and more efficient, and thus suiting the needs for mass production.

Further, in the present invention, the tops of the plurality of vertical ribs jointly define a pressure supporting surface that satisfies ergonomics and supports the body weight of a bicyclist riding the bicycle, and further, the plurality of vertical ribs may individually generate compliant or adaptive inclined deformations of different degrees in response to an inertial force induced by different road conditions (such as moving uphill or downhill) or variation of the posture of the body, so as to achieve a compliant or adaptive dynamic shock absorption function.

A technical solution adopted in the present invention will be further described with reference to embodiments provided below and the attached drawings.

DETAILED DESCRIPTION OF THE PREFERRED EMBODIMENTS

Figure 1:
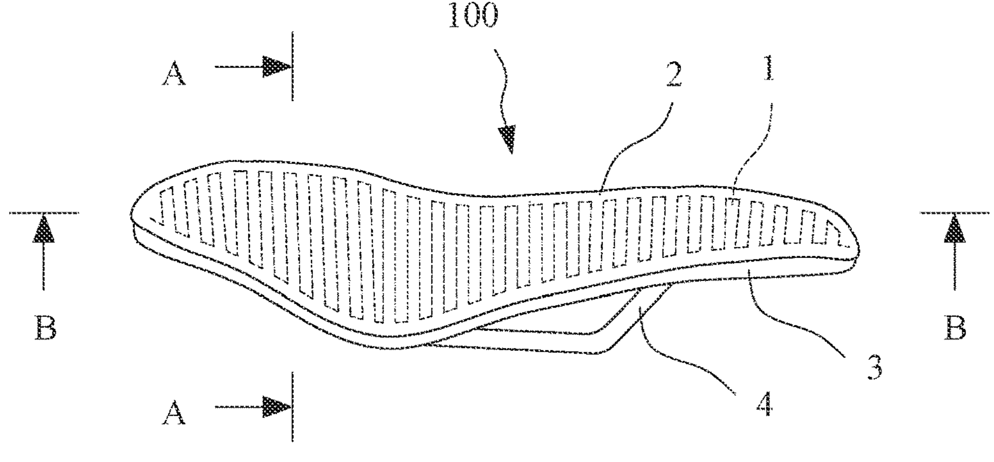
FIG. 1 is a side elevational view showing a three-dimensional bicycle saddle according to a first embodiment of the present invention.

Referring to FIG. 1, a side elevational view of a three-dimensional bicycle saddle 100 according to a first embodiment of the present invention is provided. The three-dimensional bicycle saddle 100 according to the present invention comprises a saddle body 1, and also comprises an outer cover layer 2 mounted to a top of the saddle body 1 and a support frame 3 mounted to a bottom thereof. The support frame 3 is connectable, by means of a mounting rack 4 that is known in the art, to a vertical post (not shown) of a bicycle. The three-dimensional saddle 100 can be used as a saddle for electrical vehicles or automobiles, or can serve as a saddle for other applications.

Figure 2:
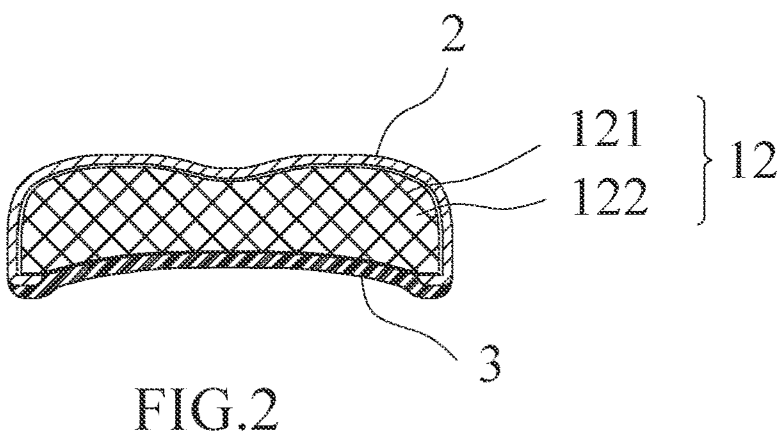
FIG. 2 is a cross-sectional view taken along section A-A of FIG. 1.
Figure 3:
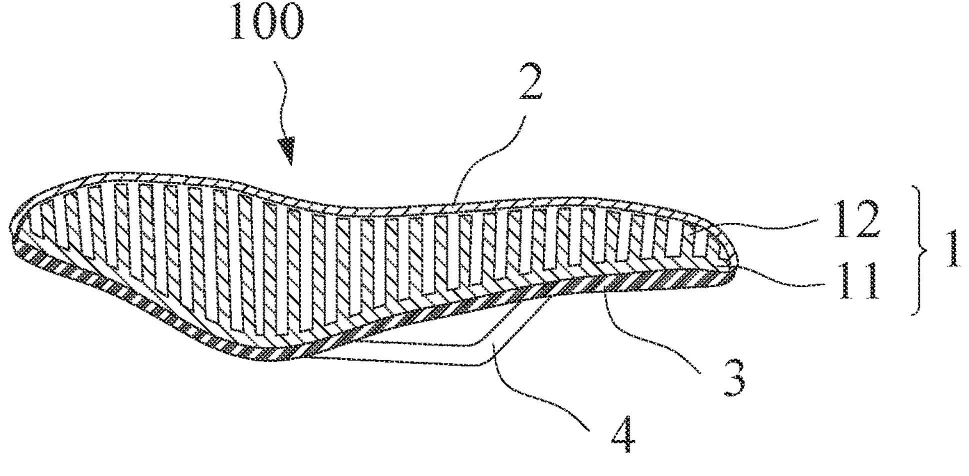
FIG. 3 is a cross-sectional view taken along section B-B of FIG. 1.
Figure 4:
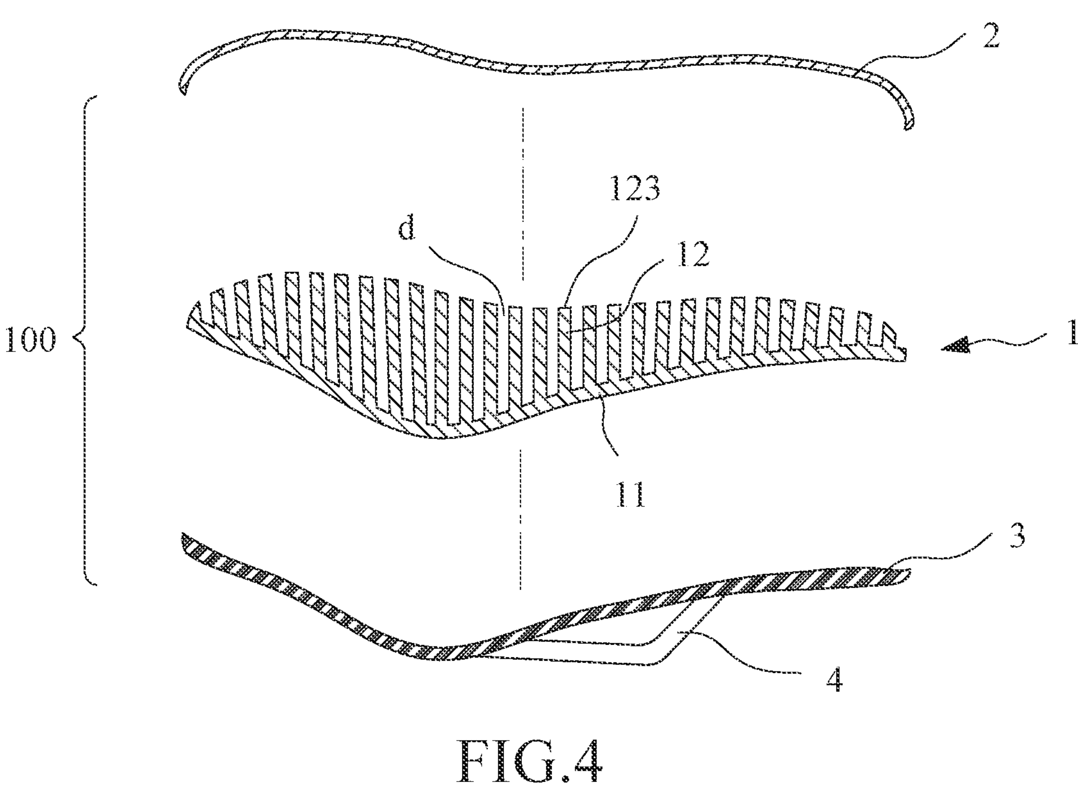
FIG. 4 is a cross-sectional view showing the three-dimensional bicycle saddle according to the first embodiment of the present invention in a condition that components thereof are detached from each other.

FIG. 2 is a cross-sectional view taken along section A-A of FIG. 1. FIG. 3 is a cross-sectional view taken along section B-B of FIG. 1. FIG. 4 is a cross-sectional view showing the three-dimensional bicycle saddle 100 according to the first embodiment of the present invention in a condition that components thereof are detached from each other. The saddle body 1 according to the present invention comprises a base layer 11 and a plurality of vertical ribs 12 formed on the base layer 11. As shown in FIG. 2, preferably, each of the vertical ribs 12 is made in a grillwork- or honeycomb-like structure, and is formed of a plurality of grating bars 121 that are parallel arranged and spaced from each other and forming a plurality of hollowed portions 122 between adjacent ones of the grating bars 121. As shown in FIG. 3, the vertical ribs 12 are spaced from each other by a spacing distance d and are arranged to connect to the base layer 11 in an arrangement direction M1.

In the art of fabrication of the saddle body 1 according to the present invention, a proper material is selected and a technique of integrally forming as a one-piece structure is applied. The material for making the saddle body 1 can be selected among polyurethanes (PU), ethylene vinyl acetate (EVA), polypropylene (PP), thermoplastic rubber (TPR), and polyvinyl chloride (PVC). Preferably, the saddle body 1 is formed by means of three-dimensional (3D) printing technology.

Figure 5:
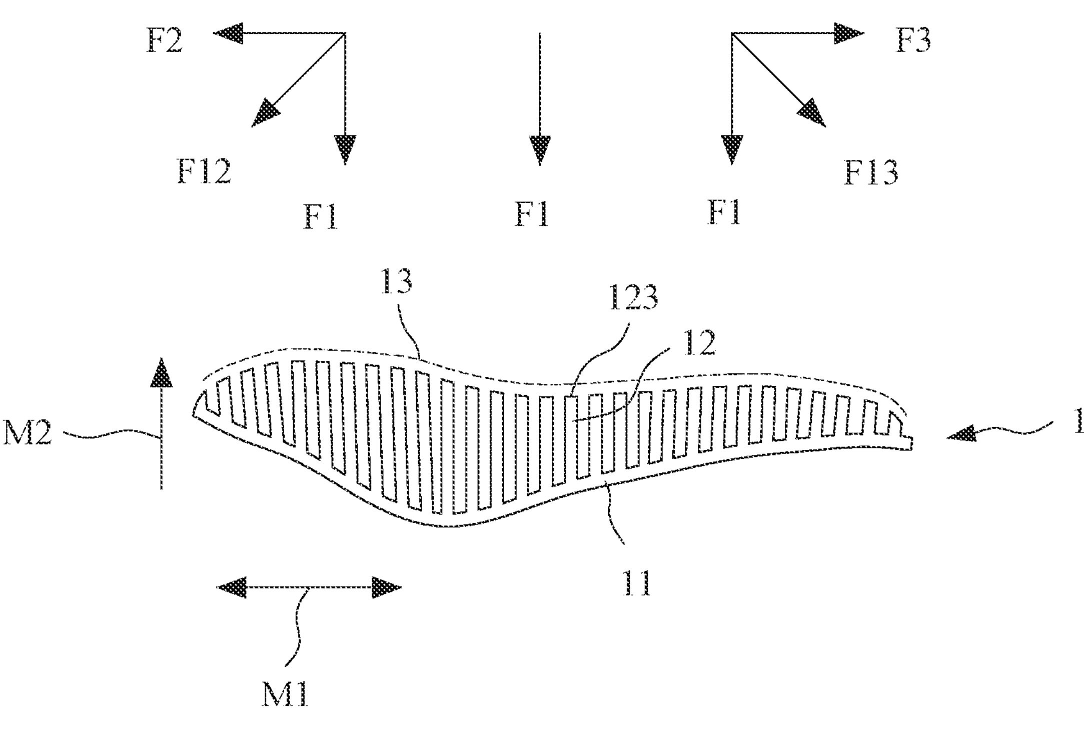
FIG. 5 is a side elevational view showing a saddle body according to the first embodiment of the present invention.
Figure 6:
FIG. 6 is a top plan view showing the saddle body according to the first embodiment of the present invention.
Figure 6:
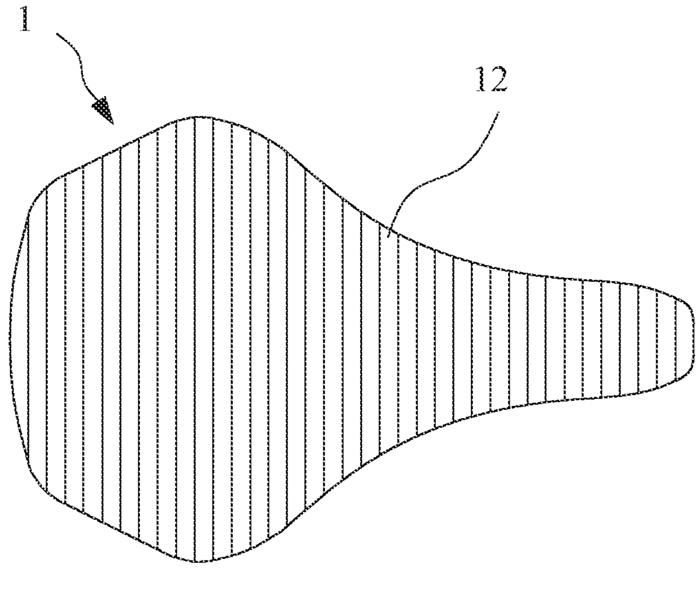
Figure 7:
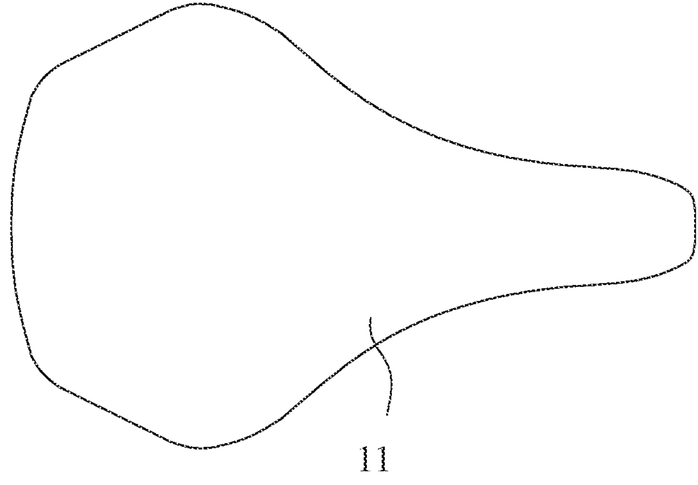
FIG. 7 is a bottom plan view showing the saddle body according to the first embodiment of the present invention.

Referring to FIGS. 5-6, wherein FIG. 5 is a side elevational view showing the saddle body 1 according to the first embodiment of the present invention, and FIG. 6 is a top plan view showing the saddle body 1 according to the first embodiment of the present invention. FIG. 7 is a bottom plan view showing the saddle body 1 according to the first embodiment of the present invention. As shown in the drawings, in the saddle body 1 according to the present invention, the plurality of vertical ribs 12 are each extended from the base layer 11 in an upward extension direction M2 to an extension height, and the plurality of vertical ribs 12 may be extended to different extension heights according to a surface contour desired for the saddle, so that top edges 123 of the plurality of vertical ribs 12 jointly define a pressure supporting surface 13 that satisfies ergonomics for the saddle body.

Particularly referring to FIG. 5, when the top edges 21 of the plurality of vertical ribs 2 receive a downward action force F1 (such as the body weight of a bicyclist) acting thereon, the plurality of vertical ribs 2 respond to the downward action force F1 acting on individual ones thereof to generate adaptive or compliant inclined deformations of different degrees.

When the top edges 21 of the plurality of vertical ribs 2 receive a resultant force F12 of a downward action force F1 (such as the body weight of a bicyclist) and a backward inclined action force F2 (such as an inertial force of the body of the bicyclist in a backward direction in riding uphill) simultaneously acting thereon, the plurality of vertical ribs 2 respond to the resultant force F12 to generate adaptive or compliant inclined deformations of different degrees.

When the top edges 21 of the plurality of vertical ribs 2 receive a resultant force F13 of a downward action force F1 (such as the body weight of a bicyclist) and a frontward inclined action force F3 (such as an inertial force of the body of the bicyclist in a frontward direction in riding downhill) simultaneously acting thereon, the plurality of vertical ribs 2 respond to the resultant force F13 to generate adaptive or compliant inclined deformations of different degrees.

Figure 8:
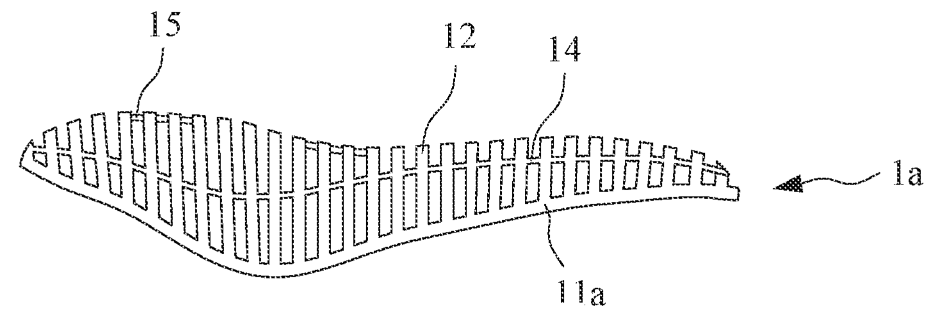
FIG. 8 is a side elevational view showing a saddle body according to a second embodiment of the present invention.
Figure 9:
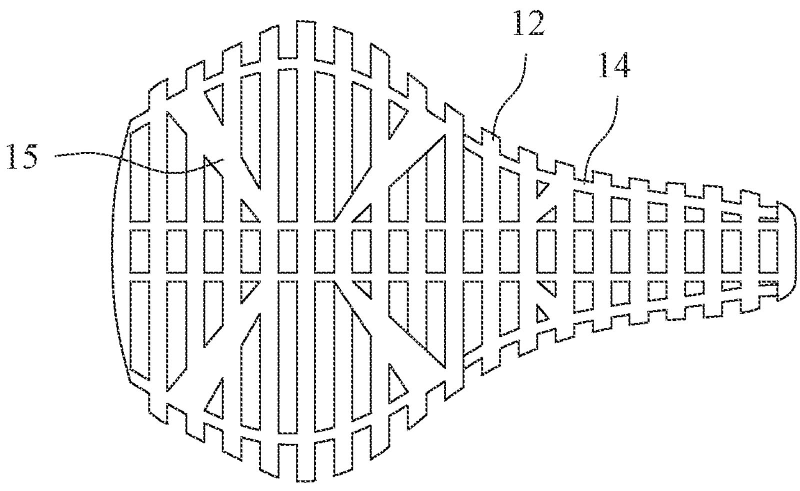
FIG. 9 is a top plan view showing the saddle body according to the second embodiment of the present invention.
Figure 10:
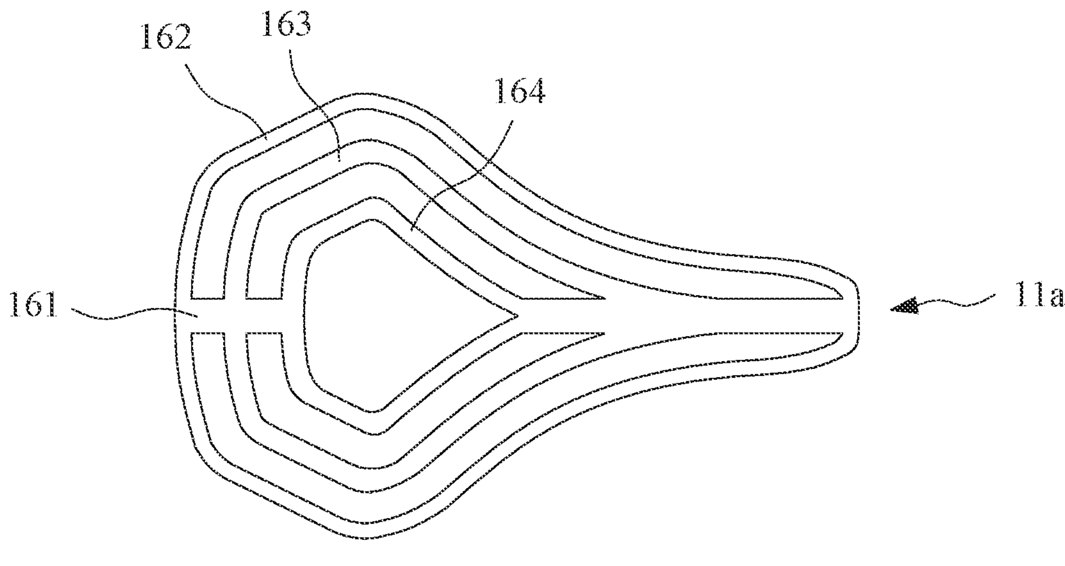
FIG. 10 is a bottom plan view showing the saddle body according to the second embodiment of the present invention.

Referring to FIGS. 8-10, wherein FIG. 8 is a side elevational view showing a saddle body 1*a* according to a second embodiment of the present invention; FIG. 9 is a top plan view showing the saddle body 1*a* according to the second embodiment of the present invention; and FIG. 10 is a bottom plan view showing the saddle body 1*a* according to the second embodiment of the present invention. The constituent components of the instant embodiment are generally similar to those of the first embodiment, and for consistency, identical components are designated with the same or similar reference sign.

In the instant embodiment, the saddle body 1*a* is additionally provided with a reinforcing side circumferential rib 14 (as shown in FIG. 8) arranged in a side circumference thereof to connect with each of the vertical ribs 12, so that when each of the vertical ribs 12 is acted upon by a force and generates the adaptive inclined deformation, the inclined deformation may be taken through adjacent ones of the vertical ribs 12 being interconnected with each other. Further, a diagonal reinforcing rib 15 (as shown in FIG. 9) may be further provided among adjacent ones of the vertical ribs 12 to enhance connection stability for each of the vertical ribs 12.

The base layer may be formed as a continuous structure, similar to that of the first embodiment, or it can be a structure having hollows formed in a portion thereof, similar to that of the second embodiment (as shown in FIG. 10). For example, the base layer 11*a* may comprises a central rib 161 and a plurality of circumferential ribs 162, 163, 164 that are spaced from each other.

The embodiments described above are provided only for illustrating the present invention and are not intended to limit the scope of the present invention. Equivalent modifications and substitutes that do not depart from the spirits of the present invention are considered failing in the scope of patent protection of the present invention that is defined in the following claims.

What is claimed is:

1. A three-dimensional bicycle saddle structure, comprising:

a saddle body mounted on a support frame;

the saddle body including a base layer and a plurality of vertical ribs spaced from each other by a spacing distance and arranged on the base layer in an arrangement direction, each of the plurality of vertical ribs having a bottom on and extending upward from the base layer in an upward extension direction to a height, and tops of the plurality of vertical ribs jointly form a pressure supporting surface for the saddle body;

wherein a reinforcing side circumferential rib is arranged on a side circumference of the saddle body to connect with each of the plurality of vertical ribs.

2. The three-dimensional bicycle saddle structure according to claim 1, wherein the saddle body is made of a material selected among polyurethanes (PU), ethylene vinyl acetate (EVA), polypropylene (PP), thermoplastic rubber (TPR), and polyvinyl chloride (PVC).

3. The three-dimensional bicycle saddle structure according to claim 1, wherein the base layer and the plurality of vertical ribs are formed by three-dimensional (3D) printing.

4. The three-dimensional bicycle saddle structure according to claim 1, wherein each vertical rib of the plurality of vertical ribs is formed of a plurality of grating bars arranged parallel and spaced from each other, and wherein a plurality of hollowed portions are formed between adjacent ones of the plurality of grating bars.

5. The three-dimensional bicycle saddle structure according to claim 1, wherein the base layer is formed as a continuous surface.

6. The three-dimensional bicycle saddle structure according to claim 1, wherein the base layer, further, includes a central rib and at least one circumferential rib connected to the central rib.

7. The three-dimensional bicycle saddle structure according to claim 6, wherein the base layer, further, includes a plurality of circumferential ribs, and wherein the plurality of circumferential ribs are connected to the central rib in a mutually spaced manner.

8. A three-dimensional bicycle saddle structure, comprising a saddle body mounted on a support frame;

the saddle body including a base layer and a plurality of vertical ribs spaced from each other by a spacing distance and arranged on the base layer in an arrangement direction, each of the plurality of vertical ribs having a bottom on and extending upward from the base layer in an upward extension direction to a height, and tops of the plurality of vertical ribs jointly form a pressure supporting surface for the saddle body;

wherein the base layer, further, includes a central rib and at least one circumferential rib connected to the central rib.

9. The three-dimensional bicycle saddle structure according to claim 8, wherein the saddle body is made of a material selected among polyurethanes (PU), ethylene vinyl acetate (EVA), polypropylene (PP), thermoplastic rubber (TPR), and polyvinyl chloride (PVC).

10. The three-dimensional bicycle saddle structure according to claim 8, wherein the base layer and the plurality of vertical ribs are formed by three-dimensional (3D) printing.

11. The three-dimensional bicycle saddle structure according to claim 8, wherein the base layer, further, includes a plurality of circumferential ribs, and wherein the plurality of circumferential ribs are connected to the central rib in a mutually spaced manner.

12. The three-dimensional bicycle saddle structure according to claim 8, wherein each vertical rib of the plurality of vertical ribs is formed of a plurality of grating bars arranged parallel and spaced from each other, and wherein a plurality of hollowed portions are formed between adjacent ones of the plurality of grating bars.

13. The three-dimensional bicycle saddle structure according to claim 8, wherein the base layer is formed as a continuous surface below the plurality of vertical ribs and above the central rib and the at least one circumferential rib.

* * * * *